United States Patent [19]

Shinohara et al.

[11] 3,984,370
[45] Oct. 5, 1976

[54] ROOM TEMPERATURE-CURABLE ELASTIC COMPOSITION

[75] Inventors: Yoshiyuki Shinohara; Shigeru Wada, both of Ohtake; Tatsuo Kinoshita, Waki, all of Japan

[73] Assignee: Mitsui Petrochemical Industries Ltd., Tokyo, Japan

[22] Filed: Jan. 21, 1975

[21] Appl. No.: 542,792

[30] Foreign Application Priority Data

Feb. 5, 1974 Japan............................... 49-14-148
Nov. 28, 1974 Japan............................. 49-135883

[52] U.S. Cl. ............................: 260/37 EP; 260/830 P
[51] Int. Cl.² .................. C08L 63/00; C08L 63/02
[58] Field of Search ..................... 260/37 EP, 830 P

[56] References Cited
UNITED STATES PATENTS

| | | | |
|---|---|---|---|
| 2,888,439 | 5/1959 | Simons........................ | 260/830 P X |
| 3,158,586 | 11/1964 | Krause......................... | 260/830 P X |

*Primary Examiner*—Lewis T. Jacobs
*Attorney, Agent, or Firm*—Sherman & Shalloway

[57] ABSTRACT

A composition curable at room temperature comprising

A. a specific diamine having a molecular weight of about 5,000 to about 25,000 and expressed by the formula

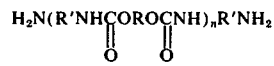

B. about 0.8 to about 3 mols, per mol of the diamine (A), of a diepoxy compound, C. about 10 to about 300 parts by weight, per 100 parts by weight of the total of the diamine (A) and the diepoxy compound (B), of an inorganic filler, and (D) 0 to 150 parts by weight in total, per 100 parts by weight of the diamine (A) of an assistant selected from the group consisting of 0 to 10 parts, per 100 parts by weight of the diamine (A), of a curing promotor, 0 to 100 parts by weight, per 100 parts by weight of the diamine (A), of an organic filler and 0 to 50 parts by weight, per 100 parts by weight of the diamine (A), of a viscosity controlling agent.

11 Claims, No Drawings

ROOM TEMPERATURE-CURABLE ELASTIC COMPOSITION

This invention relates to a room temperature-curable elastic composition useful, for example, as a sealant which has superior elongation at break, peel adhesion strength and thixotropic property and also desirable hardness with moderate elasticity and good age-resistance.

More specifically, the invention relates to a room temperature-curable elastic composition comprising (A) a diamine having a molecular weight of about 500 to about 25000 expressed by the general formula

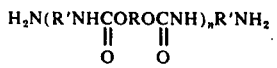

wherein
R is a residue of a long-chain diol having a molecular weight of about 500 to about 15000,
R' is selected from the group consisting of alkylene and arylene, and
n is an integer of 1 to 25,
(B) about 0.8 to about 3 mols, per mole of the diamine (A), of a diepoxy compound, (C) about 10 to about 300 parts by weight, per 100 parts by weight of the total amount of the diamine (A) and the diepoxy compound (B), of an inorganic filler, and (D) 0 to 150 parts by weight, per 100 parts by weight of the diamine (A), of an assistant selected from the group consisting of 0 to 10 parts by weight, per 100 parts by weight of the diamine (A), of a curing promotor, 0 to 100 parts by weight, per 100 parts by weight of the diamine (A), of an organic filler and 0 to 50 parts by weight, per 100 parts by weight of the diamine, of a viscosity controlling agent.

The composition of this invention is useful as various sealants such as a caulk roofing material, floor coating material or ceiling coating material.

In the sealant field, elastic sealants have recently come into increasing use because of the need to absorb the deformation of an adherend made of such a material as wood, synthetic resins, concrete, glass or metal and to prevent a reduction in the sealant effect. Typical examples of the elastic sealants are polyurethane, polysulfide and silicone rubber compositions. The polyurethane composition, however, suffers from limited utility because of its unsatisfactory age resistance and adhesiveness in spite of its low cost. The polysulfide composition has good age resistance, but because it emits offensive odor, it poses a problem of bad working environment. Moreover, this composition has insufficient adhesiveness and is expensive. The silicone rubber composition has a defect in adhesiveness and is expensive, and therefore, has not gained wide acceptance.

On the other hand, some proposals have been known in which a composition comprising an epoxy resin having superior adhesiveness is utilized as a sealant. However, no composition has been provided which has a high elongation at break, high elastic recovery (low permanent set), high peel adhesion strength (at 150% stretch) and good thixotropic property required for sealant uses, and which exhibits superior flowability at the time of application, can be applied easily and assuredly, and is not likely to flow and spread after the application and before curing.

A curable composition has previously been known which comprises an amino-terminated polyamideamine consisting of a polycarboxylic acid and a compound of the following formula

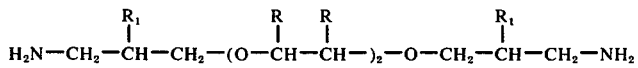

wherein
$R_1$ is selected from a hydrogen atom and a methyl group,
the two R groups attached to the adjacent carbon atoms together contain a total of not more than about 4 carbon atoms, and
n is an integer of 1 to 40,
and an epoxy resin (Japanese Patent Publication No. 26282/64 corresponding to U.S. Pat. No. 3,257,342, British Pat. No. 1,039,021, and west German Pat. No. 1,520,287). This composition has good thixotropic property, but still has unsatisfactory elongation at break and peel adhesion strength att 150% stretch.

Japanese Patent Publication No. 12516/66 discloses a curable composition comprising a liquid glycol diamine expressed by the formula

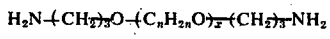

wherein
n is a number of 2 to 5, and
x is a number of 1 to 11,
and an epoxy resin. This composition is neither satisfactory in respect of the same properties as in the composition first cited above.

Japanese Patent Publication No. 34155/70 discloses that a curing agent for epoxy resins is produced by reacting a polyisocyanate derivative of polyether polyol with glycidol and reacting the resulting polyether polyglycidyl compound further with a polyalkylene polyamine or a mixture of a polyalkylene polyamine and an aliphatic monoamine. Epoxy resin compositions having incorporated therein this curing agent have good elongation at break and peel adhesion strength, but extremely poor thixotropic property which makes it very much limited in its utility.

We have made investigations in order to provide a composition free from the defects of these prior art techniques and having their merits, and found that a composition comprising (A) 1 mol of a diamine, (B) about 0.8 to about 3 mols of a diepoxy compound, (C) about 10 to about 300 parts by weight, per 100 parts by weight of the total amount of the diamine (A) and the diepoxy compound (B), and (D) not more than 150 parts by weight, per 100 parts by weight of the diamine (A), of an assistant is curable at room temperature and has high elongation at break, high elastic recovery and high peel adhesion strength at 150% stretch and also superior thixotropic property.

It was further found that the above thixotropic property can be further improved by using a curing promotor selected from aliphatic hydroxylamines having a molecular weight of 50 to 500 and aliphatic polyamines having a molecular weight of 50 to 500 as the assistance (D) together with the components (A), (B) and (C) and using an inorganic filler at least a part of which is finely divided anhydrous silica, preferably in an amount of 0.5 to 20 parts by weight, per 100 parts by weight of the diamine (A) as the inorganic filler.

Accordingly, it is an object of this invention to provide an elastic composition curable at room temperature having superior elongation at break, high peel adhesion strength at 150% stretch and superior thixotropic property and also desirable hardness with moderate elasticity and good age resistance.

Other objects and advantages of this invention will become more apparent from the following description.

The diamine curing agent (A) used in the composition of this invention is a diamine having a molecular weight of about 5000 to about 25000 which is expressed by the following formula

wherein
R is a residue of a long-chain diol having a molecular weight of about 500 to about 15000,
R' is selected from alkylene and arylene, and
n is an integer of 1 to 25.

Preferred R groups are residues of polyoxyalkylene glycols, diol derivatives of hydrocarbon polymers or copolymers and polyester diols derived from aliphatic carboxylic acids or their anhydrides and alkylene glycols. Preferably, R' is selected from the group consisting of alkylenes of 2 to 12 carbon atoms and arylenes of 6 to 14 carbon atoms.

Specific examples of compounds expressed by HOROH from which these diol residues are derived are polyoxyalkylene glycols such as polyoxypropylene glycol, polyoxybutylene glycol and polyoxypentamethylene glycol, diols of hydrocarbon polymers such as polybutadiene diol, polybutadiene-acrylonitrile diol, polybutadiene-styrene diol, polyisoprene diol and polyisobutylene diol, and long-chain diols composed mainly of aliphatic bonds such as polyester diols obtained by copolymerizing aliphatic dicarboxylic acids or their anhydrides with diols.

The alkylene group for R' is a term embracing a cycloalkylene group, and the arylene for R' includes phenylene and naphthylene which may contain a lower alkyl group as a substituent. Or they may contain a urethane linkage within the molecule.

Specific examples of compounds OCNR'NCO from which R' is derived are tolylene diisocyanate, 4,4'-diphenylmethane diisocyanate, dianisidine diisocyanate, meta-xylylene diisocyanate, 1,5-naphthalene diisocyanate, trans-vinylene diisocyanate, and hexamethylene diisocyanate.

If the molecular weight of the long-chain diol is too low, the elastic property of the resulting composition is degraded, and when the molecular weight is too high, the resulting diamine also has a high molecular weight and thus retards curing. Accordingly, the long-chain diols should have a molecular weight of about 500 to about 15,000, preferably about 1,000 to about 12,000. Preferably, R' is aliphatic.

The n in the above formula, although differing according to the molecular weight of R or R', is selected so that the molecular weight of the resulting diamine (A) becomes about 5,000 to about 25,000, preferably about 10,000 to about 20,000. If the molecular weight of the diamine (A) is too low, the elastic property of the resulting composition is degraded, and when the molecular weight is too high, it retards the curing of the composition.

Examples of preferred diepoxy compounds (B) used in the composition of this invention are those derived from compounds selected from bisphenol A, its alkylene oxide adducts (for example, $C_2$–$C_6$, preferably $C_2$–$C_4$ alkylene oxide adducts), alkylene glycols (for example, $C_2$–$C_6$, preferably $C_2$–$C_4$, alkylene glycols), phthalic acid and p-hydroxybenzoic acid and compounds selected from epichlorohydrin and β-methylepichlorohydrin. Preferably, these diepoxy compounds (B) have a molecular weight of about 200 to about 1000. Specific examples of these diepoxy compounds are bisphenol A glycidyl ethers derived from bisphenol A and epichlorohydrin or β-methylepichlorohydrin, polyalkylene glycol diglycidyl ethers derived from polyoxypropylene glycols and epichlorohydrin or β-methylepichlorohydrin, phthalic acid diglycidyl esters derived from phthalic acid and epichlorohydrin or β-methylepichlorohydrin, glycidyl ether esters derived from p-hydroxybenzoic acid and epichlorohydrin or β-methylepichlorohydrin, and glycidyl ethers derived from an ethylene oxide adduct of bisphenol A and epichlorohydrin or β-methylepichlorohydrin.

In the composition of this invention, the above diepoxy compound (B) is used in an amount of about 0.8 to about 3 mols, preferably about 1 to about 2.5 mols, per mol of the above diamine (A). If the amount of the diepoxy compound (B) is too small, it is difficult to cure the composition smoothly, and on the other hand, if the amount is too large, the cured product becomes excessively hard, and good elongation at break cannot be obtained.

In addition to the diamine (A) and the diepoxy compound (B), about 10 to about 300 parts by weight, preferably about 20 to about 200 parts by weight, per 100 parts by weight of the total amount of the diamine (A) and the diepoxy compound (B), of the inorganic filler (C) is incorporated into the composition. If the inorganic filler is not incorporated, the resulting composition has low tensile strength and elongation, and poor age resistance. The addition of the inorganic filler (C) leads to marked improvement of these properties. Examples of the inorganic filler are carbon black, silica, finely divided anhydrous silica, zinc oxide, titanium dioxide, magnesium oxide, calcium oxide, magnesium carbonate, calcium carbonate, talc, clay, alumina white, asbestos, diatomaceous earth, glass fibers, lithopone, white lead, cadmium yellow, chrome yellow, titan yellow, ochre, chrome vermillion, chrome orange umber, yellow iron oxide, red iron oxide, cadmium red, red lead, prussian blue, ultramarine, cobalt blue, mineral violet, cobalt violet, and black iron oxide.

Up to 150 parts by weight, preferably up to 100 parts by weight, per 100 parts by weight of the diamine (A) of an assistant selected from the group consisting of (D-1) 0 to 10 parts by weight, preferably 0.05 to 10 parts by weight, per 100 parts by weight of the diamine A, of a curing promotor, (D-2) 0 to 100 parts by weight, preferably 1 to 100 parts by weight, per 100 parts by weight of the diamine (A), of an organic filler, and (D-3) 0 to 50 parts by weight, per 100 parts by weight of the diamine (A), of a viscosity controlling agent can be incorporated in the composition of this invention in addition to the above diamine (A), the diepoxy compound (B) and the inorganic filler (C).

Examples of the curing promotor (D-1) above are water, phenol, phenol derivatives, mono- or polyhydric alcohols, aliphatic polyamines having a molecular weight of 50 to 500 and aliphatic hydroxylamines having a molecular weight of 50 to 500. Examples of the above phenol derivatives are cresol, resorcinol, catechol, hydroquinone, and tris(dimethylaminomethyl)-phenol. Examples of the alcohols are ethanol, propanol, butanol, ethylene glycol, propylene glycol, glycerol, and polyalkylene polyols having a molecular weight of about 200 to about 3000 such as polyethylene glycol and polyoxypropylene glycol. The above aliphatic polyamines are preferably aliphatic polyamines containing at least two aliphatic primary amines or secondary amines in the molecules. Examples of such aliphatic polyamines are ethylene diamine, diethylene triamine, triethylene tetramine, tetraethylene pentamine, N-methyl ethylene diamine, N,N'-dimethyl ethylene diamine, and hexamethylene diamine.

The above aliphatic hydroxylamines are preferably aliphatic hydroxylamines having at least one aliphatic primary amine or secondary amine and at least one hydroxyl group in the molecule. Specific examples of such aliphatic hydroxylamines are ethanolamine, diethanolamine, 3-amino-1-propanol, 2-amino-2-methyl-1-propanol, 2-amino-1-butanol, and 2-(2-aminoethoxy) ethanol.

In the present invention, a composition comprising the diamine (A), the diepoxy compound (B), the inorganic filler (C) and a curing promotor as the assistant ably in an amount of about 0.5 to about 20 parts by weight, per 100 parts by weight of the diamine (A), is especially preferred since it provides the desired properties conveniently.

Examples of the organic filler (D-2) above are phenolic resins and petroleum resins. Examples of the viscosity controlling agent (D-3) are phthalic acid esters, preferably $C_1$-$C_{20}$ alkyl esters of phthalic acid, mineral oils, vegetable oils, animal oils, adipic acid esters, maleic acid esters, fumaric acid esters, and phosphoric acid esters.

The diamine (A) used in this invention can be easily prepared, for example, by the method disclosed in Japanese Laid-Open Patent Publication No. 95908/74, which comprises reacting a polyisocyanate having a plurality of

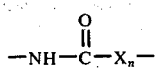

groups in one molecule, wherein X is O or S, and $n$ is 0 or 1, with at least an equivalent, based on the isocyanate group, of a strong acid and water, and then treating the reaction product with alkali.

The following Examples and Comparative Examples illustrate the present invention in greater detail.

EXAMPLE 1 TO 3 AND COMPARATIVE EXAMPLES 1 TO 6

In each run, a composition in accordance with this invention was prepared from;

| | | |
|---|---|---|
| (A) | Curing agent | 100 parts by weight. |
| (B) | Diepoxy compound | the amount indicated in Table 1 per mol of the curing agent. |
| (C) | Inorganic filler | 67 parts by weight per 100 parts by weight of the total amount of the curing agent and the diepoxy compound. |
| (D) | Curing promoter | 6 parts by weight, per 100 parts by weight of the curing agent. |
| | (n-butanol | 100 parts by weight, per 100 parts by weight of the curing agent.) |

The compounds used here were as follows:

(A) Curing agent
Curing agent (A); $H_2N(R'NHCOROCNH)_nR'NH_2$ with both C=O
R = polyoxypropylene (molecular weight 2780)
R' = hexamethylene (molecular weight = 16200)

Curing agent (A'); Polyamideamine derived from
$H_2N(CH_2)_3-O(C_2H_4O)_{20}-(CH_2)_3-NH_2$ and adipic acid Curing agent (A''); $H_2N(CH_2)_3-O(C_2H_4O)_{10}(CH_2)_3-NH_2$ Curing agent (A'''); $H_2N(CH_2)_3-O-(C_2H_4O)_{50}-(CH_2)_3-NH_2$ Curing agent (A''''); Polyether diamine having a molecular weight of 19100

(B) Diepoxy compound;
having a molecular weight of 370 and an epoxy equivalent of 187, derived from bisphenol A and epichlorohydrin.

(C) Inorganic filler;
6:1:0.3 (weight) mixture of Talc, titanium dioxide and finely divided anhydrous silica.

(D) Curing promotor;
7:1:2 (weight) mixture of tris (dimethyl aminomethyl)phenol, triethylene tetramine and water.

(D) selected from the group consisting of aliphatic polyamines having a molecular weight of 50 to 500 and aliphatic hydroxylamines having a molecular weight of 50 to 500, wherein at least a part of said inorganic filler (C) consists of finely divided anhydrous silica, prefer- The elongation at break (JIS K-301), peel adhesion strength at 150% stretch (JIS A-5754) and hardness (JIS K-6301) of a cured product obtained by curing each of the compositions at room temperature for 2 weeks, and the thixotropic property (slump test —JIS A-5754) of the compositions were determined, and the results are shown in Table 1.

Table I

| Examples (Ex.) and Comparative Examples (Comp.) | Diamine as curing agent | Amount of the diepoxy compound (mols) | Elongation at break (%) | Peel adhesion strength at 150% stretch | Thixotropic property (slump test mm)* |
|---|---|---|---|---|---|
| Example 1 | (A) | 1 | 380 | 12.9 | 0 |
| Example 2 | (A) | 1.8 | 310 | 13.5 | 0 |
| Example 3 | (A) | 2.5 | 220 | 15.0 | 0 |
| Comp. 1 | (A) | 0.5 | did not cure | Unmeasurable** | 0 |
| Comp. 2 | (A) | 3.5 | 120 | Unmeasurable** | 0 |
| Comp. 3 | (A') | 1.0 | 100 | Unmeasurable** | 0 |
| Comp. 4 | (A'') | 1.0 | 30 | Unmeasurable** | 2 |
| Comp. 5 | (A''') | 1.0 | 80 | Unmeasurable** | 1 |
| Comp. 6 | (A'''') | 1.0 | 350 | 11.7 | above 50 |

*"0" shows that there was no flow down, and "above 50 mm" shows that all flowed down.
**The measurement was impossible because the elongation was below 150%.

The curing agent (A) in accordance with this invention was prepared as follows:

2000 parts by weight of polyoxypropylene glycol was reacted with 160 parts by weight of hexamethylene diisocyanate in 2000 parts by weight of dioxane as a solvent using 4 parts by weight of di-n-butyl tin dilaurate as a catalyst at 90°C. for 2 hours to afford polyether diisocyanate. 2080 Parts by weight of the dioxane solution of the polyether diisocyanate was added dropwise to a mixture of 63 ml. of hydrochloric acid, 2000 parts by weight of dioxane and 1000 parts by weight of water at 70°C. over the course of 1 hour. After the addition, the reaction was carried out at 70°C. for 1 hour, and then a solution of 33.5 parts by weight of sodium hydroxide in 1000 parts by weight of water was added. After washing out the unreacted alkali sufficiently, the reaction product was dried at reduced pressure. This polyether diamine had a molecular weight, as determined by an end group analysis method, of 16200.

The curing agent (A'''') was prepared as follows:

2080 Parts by weight of the dioxane solution of polyether diisocyanate prepared in the manner described above was heated to 70°C., and then 20 parts by weight of dehydrated and distilled glycidol was added. They were reacted at 90°C. for 2 hours. The resulting polyether diglycidyl had an epoxy equivalent of 9000.

The above dioxane solution of polyether diglycidyl was added dropwise over the course of 1 hour to a solution consisting of 3000 parts by weight of dioxane, 450 parts by weight of hexamethylene and 300 parts by weight of ethanol and maintained at 60°C., and they were further reacted for 3 hours.

The unreacted hexamethylene diamine was removed by washing with water, and the product was dried at reduced pressure. The resulting polyether diamine had a molecular weight, as determined by an end group analysis method, of 19100.

EXAMPLES 4 TO 8 AND COMPARATIVE EXAMPLES 7 AND 8

One mol of a bisphenol A-type epoxy resin having an epoxy equivalent of 190 was mixed with 0.3, 0.45, 0.55, 0.7, 0.85, 1.0, or 1.5 mol of a diamine of the formula

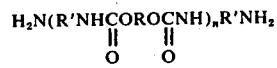

in which R was a polyoxypropylene group having a molecular weight of 2,000, and R' was a hexamethylene group and which had a molecular weight of 11,230. The resulting mixture was further mixed well with 0.5 part by weight of carbon black, 40 parts by weight of clay, 3.5 parts by weight of silica, 20 parts by weight of titanium dioxide, 5 parts by weight of hydroquinone and 5 parts by weight of ethanol, all based on 100 parts by weight of the diamine. The resulting composition was cured at room temperature for 2 weeks. The properties of the cured products were determined, and the results are shown in Table 2.

Table 2

| Examples (Ex.) and Comparative Examples (Comp.) | Amount of diamine (mols) | Elongation at break (%) | Tensile strength (Kg/cm²) | Peel adhesion strength (glass) (Kg/cm²) |
|---|---|---|---|---|
| Ex. 4 | 0.45 | 900 | 21.3 | 3.5 |
| Ex. 5 | 0.55 | 690 | 26.8 | 8.5 |
| Ex. 6 | 0.70 | 580 | 30.3 | >10 |
| Ex. 7 | 0.85 | 670 | 27.2 | 7.9 |
| Ex. 8 | 1.0 | 850 | 21.0 | 5.1 |
| Comp. 7 | 0.3 | could not be cured | | |
| Comp. 8 | 1.5 | could not be cured | | |

EXAMPLES 9 TO 15 AND COMPARATIVE EXAMPLES 9 TO 10

Examples 6 was repeated using various other diamines as shown in Table 3. The results are shown in Table 3.

Table 3

| | Curing agent | | | Properties of the cured products | | | |
|---|---|---|---|---|---|---|---|
| | H₂N(R'NHCOROCNH)ₙR'NH₂ (O O) | | | | | | |
| Runs | R | (molecular weight) | R' | Molecular weight | Elongation at break (%) | Tensile strength (Kg/cm²) | Peel adhesion strength (glass) (Kg/cm²) |
| Ex. 6 | Polyoxypropylene | (2000) | Hexamethylene | 11230 | 580 | 30.3 | >10 |
| Ex. 9 | " | | " | 16720 | 850 | 25.6 | 5.5 |

Table 3-continued

| Runs | Curing agent H₂N(R'NHCOROCNH)ₙR'NH₂ with ‖O ‖O | | | Molecular weight | Properties of the cured products | | |
|------|---|---|---|---|---|---|---|
| | R | (molecular weight) | R' | | Elongation at break (%) | Tensile strength (Kg/cm²) | Peel adhesion strength (glass) (Kg/cm²) |
| Comp. 9 | " | | " | 36300 | The resulting composition was gelled. But its curing was extremely insufficient, and the surface became very sticky. | | |
| Comp. 10 | Polyoxypropylene | (1000) | " | 3850 | 80 | — | — |
| Ex. 10* | Polyoxypropylene | (2000) | Tolylene | 14550 | 750 | 15.3 | 6.4 |
| Ex. 11* | " | | 1,5-Naphthalene | 12300 | 700 | 17.4 | 8.5 |
| Ex. 12 | " | | m-Xylylene | 13500 | 630 | 18.5 | 7.4 |
| Ex. 13* | " | | 4,4'-Diphenylmethane | 11400 | 530 | 19.1 | 8.0 |
| Ex. 14 | Polybutadiene | (3000) | Hexamethylene | 10320 | 450 | 25.6 | 11.1 |
| Ex. 15 | Butadiene-styrene copolymer** | (7500) | " | 14700 | 600 | 20.5 | 9.4 |

*curing was performed at 50°C. for 2 weeks
**Butadiene (75 mol %):styrene (25 mol %)

EXAMPLES 16 TO 26, AND COMPARATIVE EXAMPLES 11

Examples 6 was repeated using various other diamines or additives as shown in Table 4. The results are shown in Table 4.

EXAMPLES 27 TO 29

Example 6 was repeated using various other epoxy resins and diglycidyl phthalate instead of the bisphenol A-type epoxy resin. The results are shown in Table 5.

Table 4

| Runs | Curing agent H₂N(R'NHCOROCNH)ₙR'NH₂ with ‖O ‖O | | | |
|------|---|---|---|---|
| | R (molecular weight) | R' | Molecular weight | |
| Ex. 6 | Polyoxypropylene (2000) | Hexamethylene | 11230 | |
| Ex. 16 | " | " | " | |
| Ex. 17 | Polyoxypropylene (1000) | " | 14200 | |
| Ex. 18 | " | " | " | |
| Ex. 19 | " | " | " | |
| Ex. 20 | " | " | " | |
| Ex. 21 | " | " | " | |
| Ex. 22 | " | " | " | |
| Ex. 23 | " | " | " | |
| Ex. 24 | " | " | " | |
| Ex. 25 | " | " | " | |
| Ex. 26 | " | " | " | |
| Comp. 11 | " | " | " | |

| Runs | Filler, Curing promotor, Viscosity controlling agent (part by weight, per 100 parts by weight of the curing agent) | | | | | | Properties of the cured products | |
|------|---|---|---|---|---|---|---|---|
| | | | | | | | Elongation at break (%) | Tensile strength (Kg/cm²) |
| Ex. 6 | Carbon black (0.5) | Clay (40) | Silica (3.5) | Titanium dioxide (20) | — | Hydroquinone (5) | Ethanol (5) | 580 | 30.3 |
| Ex. 16 | " (0.5) | " (70) | " (5) | " (30) | Calcium carbonate (50) | " (5) | " (5) | 270 | 65 |
| Ex. 17 | — | — | " (40) | — | — | " (5) | " (5) | 920 | 74.0 |
| Ex. 18 | — | — | — | — | Calcium carbonate (70) | " (5) | " (5) | 770 | 24.1 |
| Ex. 19 | — | Clay (70) | — | — | — | " (5) | " (5) | 1190 | 26.1 |
| Ex. 20 | — | — | — | Zinc oxide (70) | — | " | " | 750 | 30.2 |
| Ex. 21 | — | — | — | Titanium dioxide (70) | — | " (5) | " (5) | 530 | 18.9 |
| Ex. 22 | — | — | — | " (100) | — | " (5) | " (5) | 810 | 22.1 |
| Ex. 23 | — | Talc (70) | — | — | — | " (5) | " (5) | 900 | 17.6 |
| Ex. 24 | — | — | — | — | Magnesium carbonate (70) | " (5) | " | 520 | 16.3 |
| Ex. 25 | — | Diatomaceous earth (70) | — | — | — | " (5) | " (5) | 730 | 17.8 |
| Ex. 26 | — | Organic bentonite (30) | — | — | — | " (5) | " (5) | 500 | 14.2 |
| Comp. 11 | — | — | — | — | — | " (5) | " (5) | 400 | 10.9 |

Table 5

| Example | Epoxy resin | Tensile strength (Kg/cm$^2$) | Elongation at break (%) |
|---|---|---|---|
| 27 | ARALDITE CY-208* | 21.5 | 850 |
| 28 | ADK Resin EP-4000** | 13.7 | 680 |
| 29 | Diglycidyl phthalate | 11.8 | 800 |

*an epoxy resin of the polyalkylene glycol diglycidyl ether type (a product of Ciba-Geigy)
**an epoxy resin of the bisphenol A/alkylene oxide adduct diglycidyl ether type (a product of Asahi-Denka)

EXAMPLE 30

The cured product obtained in Example 6 was allowed to stand for 120 hours at 90°C. and then for 72 hours at 110°C., and the properties of the products after aging were measured. The results are shown in Table 6.

COMPARATIVE EXAMPLE 12

A commercially available urethane sealant was subjected to the same thermal stability test. The results are shown in Table 6.

Table 6

| Runs | Sample | Aging conditions | Retention (%) after aging | |
|---|---|---|---|---|
| | | | Tensile strength | Elongation |
| Ex. 30 | Epoxy | 90°C., 120 hr. | 120 | 76 |
| | | 110°C., 72 hr. | 105 | 67 |
| Comp. 12 | Urethane | 90°C., 120 hr. | 26 | 80 |
| | | 110°C., 72 hr. | Decomposed and not measurable | |

EXAMPLES 31 TO 40, AND COMPARATIVE EXAMPLE 13

Example 1 was repeated using the diamine as shown in Table 7. Further, the epoxy resin used in Example 1 was mixed in such an amount that the amount of the epoxy groups was stoichiometric with respect to the active hydrogen of the amino groups in the composition, and the slump test was conducted. The results are shown in Table 7.

Table 7

Curing agent
$$H_2N(R'NHCOROCNH)_nR'NH_2$$
$$\quad\quad\quad\; \overset{\|}{O}\quad\;\; \overset{\|}{O}$$

| Runs | R (Molecular weight) | | R' | Molecular weight | Slump (mm) |
|---|---|---|---|---|---|
| Ex. 1 | Polyoxypropylene | (2780) | Hexamethylene | 16200 | 0 |
| Ex. 31 | " | | " | 7500 | 0 |
| Ex. 32 | " | | " | 21600 | 0 |
| Comp. 13 | " | | " | 32000 | 5 |
| Ex. 33 | Polyoxypropylene | (2000) | Tolylene | 14550 | 0 |
| Ex. 34 | " | | 1,5-Naphthalene | 12300 | 0 |
| Ex. 35 | " | | m-Xylylene | 13500 | 0 |
| Ex. 36 | " | | 4,4'-Diphenylmethane | 11400 | 0 |
| Ex. 37 | Polybutadiene | (3000) | Hexamethylene | 10320 | 0 |
| Ex. 38 | Butadiene-styrene copolymer* | (7500) | " | 14700 | 0 |
| Ex. 39 | Polyoxybutylene | (4000) | " | 14800 | 0 |
| Ex. 40 | Polyester derived from adipic acid and ethylene glycol | (2500) | " | 12300 | 0 |

*Butadiene (75 mol %): styrene (25 mol %)

EXAMPLES 41 TO 55

Example 31 was repeated using various other inorganic fillers and curing promotors as shown in Table 8. The results are shown in Table 8.

Table 8

| Runs | Curing agent $H_2N(R'NHCOROCNH)_nR'NH_2$ $\;\;\;\;\;\;\;\;\;\;\;\overset{\|}{O}\;\;\;\;\overset{\|}{O}$ R = Polyoxypropylene (molecular weight:2780) R' = Hexamethylene Molecular weight: | Inorganic fillers Talc:X:finely divided anhydrous silica (weight ratio 6:1:0.3) X: | Curing promotors Tris-(dimethylaminomethyl) phenol : Y : water (weight ratio 7 : Z : 2) Y (Z) | | Viscosity controlling agent (parts per 100 parts of curing agent) | Slump (mm) |
|---|---|---|---|---|---|---|
| Ex. 31 | 7500 | Titanium dioxide | Triethyl tetramine | (1) | n-Butanol | — | 0 |
| Ex. 41 | " | " | Ethylene diamine | (1) | " | — | 0 |
| Ex. 42 | " | " | N,N'-Dimethyl ethylene diamine | (2) | " | — | 0 |
| Ex. 43 | " | " | Hexamethylene diamine | (2) | " | — | 0 |
| Ex. 44 | " | " | Ethanol amine | (2) | " | — | 1 |
| Ex. 45 | 16200 | Clay | Triethyl tetramine | (1) | " | — | 0 |
| Ex. 46 | " | Silica | " | (1) | " | — | 0 |
| Ex. 47 | " | Calcium carbonate | " | (1) | " | — | 0 |
| Ex. 48 | " | Carbon black | " | (1) | " | — | 0 |
| Ex. 49 | " | Asbestos | " | (1) | " | — | 0 |
| Ex. 50 | " | Magnesium oxide | " | (1) | " | — | 0 |

Table 8-continued

| Runs | Curing agent H$_2$N(R'NHCOROCNH)$_n$R'NH$_2$ (with C=O, C=O) R = Polyoxypropylene (molecular weight:2780) R' = Hexamethylene Molecular weight: | Inorganic fillers Talc:X:finely divided anhydrous silica (weight ratio 6:1:0.3) X: | Curing promotors Tris-(dimethylaminomethyl) phenol : Y : water (weight ratio 7 : Z : 2) Y (Z) | Viscosity controlling agent (parts per 100 parts of curing agent) | Slump (mm) |
|---|---|---|---|---|---|
| Ex. 51 | " | Zinc oxide | " (1) " | — | 2 |
| Ex. 52 | " | Titanium dioxide | " (1) " | Dioctyl phthalate(5) | 0 |
| Ex. 53 | " | " | " (1) " | Dioctyl adipate(5) | 0 |
| Ex. 54 | " | " | " (1) " | Tricotyl phosphate(5) | 0 |
| Ex. 55 | " | " | " (1) " | Mineral Oil white(5) | 0 |

COMPARATIVE EXAMPLE 14

Example 1 was repeated using 60 parts instead of 3 parts of silica. The slump of the cured product was 0 mm, but the cured product obtained by curing at 20°C. for 2 weeks was too hard, and not a rubber elastomer.

COMPARATIVE EXAMPLE 15

Example 1 was repeated without using 3 parts of silica. The slump of the resulting cured product was 3 mm.

EXAMPLES 56 TO 59

Example 31 was repeated using various other epoxy resins and diglycidyl phthalate instead of the bisphenol A-type epoxy resin. The slump test was conducted, and the results are shown in Table 9.

Table 9

| Runs | Epoxy resins | Slump (mm) |
|---|---|---|
| Ex. 56 | Epichron 800* | 0 |
| Ex. 57 | ARALDITE CY-208** | 0 |
| Ex. 58 | ADK resin EP-4000*** | 0 |
| Ex. 59 | Diglycidyl phthalate | 0 |

*an epoxy resin derived from bisphenol A and β-methyl epichlorohydrin (a product of Dainippon Ink and Chemicals)
**an epoxy resin of polyalkylene glycol diglycidyl ether type (a product of Ciba-Geigy)
***an epoxy resin of the bisphenol A/alkylene oxide adduct diglycidyl ether type (a product of Asahi-Denka)

What we claim is:

1. A composition curable at room temperature comprising
A. a diamine having a molecular weight of about 10,000 to about 25,000 and expressed by the following formula

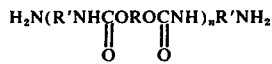

wherein
R is a residue of a polyoxyalkylene glycol having a molecular weight of about 500 to about 15,000,
R' is alkylene and
n is an integer of 1 to 25,
B. about 0.8 to about 3 mols, per mol of the diamine (A), of a diepoxy compound,
C. about 10 to about 300 parts by weight, per 100 parts by weight of the total of the diamine (A) and the diepoxy compound (B), of an inorganic filler, and
D. 0 to 150 parts by weight in total, per 100 parts by weight of the diamine (A) of an assistant selected from the group consisting of 0 to 10 parts, per 100 parts by weight of the diamine (A), of a curing promoter, 0 to 100 parts by weight, per 100 parts by weight of the diamine (A), of an organic filler and 0 to 50 parts by weight, per 100 parts by weight of the diamine (A), of a viscosity controlling agent.

2. The composition of claim 1 wherein R' in said diamine (A) is alkylene containing 2 to 12 carbon atoms and R in said diamine (A) is a residue of a polyoxyalkylene glycol selected from polyoxypropylene glycol, polyoxybutylene glycol and polyoxypentamethylene glycol.

3. The composition of claim 1 wherein said diepoxy compound is a diepoxy compound derived from a compound selected from the group consisting of bisphenol A, its alkylene oxide adducts, alkylene glycols, phthalic acid and p-hydroxybenzoic acid and a compound selected from the group consisting of epichlorohydrin and β-methylepichlorohydrin.

4. The composition of claim 1 wherein said inorganic filler (C) is selected from the group consisting of carbon black, silica, finely divided anhydrous silica, zinc oxide, titanium dioxide, magnesium oxide, calcium oxide, magnesium carbonate, calcium carbonate, talc, clay, alumina white, asbestos, diatomaceous earth, glass fibers, lithopone, while lead, cadmium yellow, chrome yellow, titan yellow, ochre, chrome vermillion, chrome orange, umber, yellow iron oxide, red iron oxide, cadmium red, red lead, prussian blue, ultramarine, cobalt blue, mineral violet, cobalt violet, and black iron oxide.

5. The composition of claim 1 which contains from 0.05 to 10 parts by weight, per 100 parts by weight of the diamine (A), of said curing promoter wherein said curing promoter (D) is a compound selected from the group consisting of water, phenol, phenol derivatives, mono- or polyhydric aliphatic alcohols, aliphatic polyamines having a molecular weight of 50 to 500 and aliphatic hydroxylamines having a molecular weight of 50 to 500.

6. The composition of claim 1 which contains from 1 to 100 parts by weight, per 100 parts by weight of the diamine (A), of said organic filler wherein said organic filler is selected from the group consisting of phenol resins and petroleum resins.

7. The composition of claim 1 which contains from 0 to 50 parts by weight, per 100 parts by weight of the diamine (A), of said viscosity controlling agent wherein said viscosity controlling agent is selected from the group consisting of phthalic acid esters, mineral oils, vegetable oils, animal oils, adipic acid esters, maleic acid esters, fumaric acid esters, and phosphoric acid esters.

8. The composition of claim 2 wherein said polyalkylene glycol has a molecular weight of from about 1,000 to about 12,000.

9. The composition of claim 5 wherein at least 0.5 to 20 parts by weight of said inorganic filler (C), per 100 parts by weight of the diamine (A), is finely divided anhydrous silica and said promoter (D) is an aliphatic polyamine having a molecular weight of 50 to 500 or an aliphatic hydroxylamine having a molecular weight of 50 to 500.

10. The composition of claim 8 wherein said diamine (A) has a molecular weight of from about 10,000 to about 20,000.

11. The composition of claim 1 which comprises 100 parts by weight of said diamine (A) having a molecular weight of about 16,200 wherein R is a polyoxypropylene having a molecular weight of about 2,780 and R' is hexamethylene; bisphenol A glycidyl ether (B) having a molecular weight of about 370 and an epoxy equivalent of about 187 derived from bisphenol A and epichlorohydrin in an amount sufficient to provide a stoichiometric amount of epoxy groups with respect to the active hydrogen of the amino groups in said composition; 67 parts by weight of inorganic filler (C); and 6 parts by weight of curing promoter (D).

* * * * *